(12) United States Patent
Cho et al.

(10) Patent No.: US 11,801,777 B2
(45) Date of Patent: Oct. 31, 2023

(54) LOAD SUPPORT APPARATUS FOR LUMBAR SUPPORT ASSEMBLY

(71) Applicant: DAECHANG SEAT CO., LTD-DONGTAN, Hwaseong-si (KR)

(72) Inventors: Chan Ki Cho, Gangwon-do (KR); Gun Young Park, Incheon (KR); Jin Oh Kim, Gyeonggi-do (KR); Tae Hong Han, Gyeonggi-do (KR)

(73) Assignee: DAECHANG SEAT CO., LTD-DONGTAN, Hwaseong-si (KR)

( * ) Notice: Subject to any disclaimer, the term of this patent is extended or adjusted under 35 U.S.C. 154(b) by 0 days.

(21) Appl. No.: 17/571,086

(22) Filed: Jan. 7, 2022

(65) Prior Publication Data

US 2022/0250510 A1 Aug. 11, 2022

(30) Foreign Application Priority Data

Feb. 10, 2021 (KR) ........................ 10-2021-0018844

(51) Int. Cl.
*B60N 2/66* (2006.01)
*B60N 2/02* (2006.01)
(Continued)

(52) U.S. Cl.
CPC ............. *B60N 2/028* (2013.01); *B60N 2/22* (2013.01); *B60N 2/66* (2013.01); *B60N 2/667* (2015.04);
(Continued)

(58) Field of Classification Search
CPC ........ B60N 2/66; B60N 2/667; B60N 2/6671; B60N 2/6673
See application file for complete search history.

(56) References Cited

U.S. PATENT DOCUMENTS

| 10,632,882 B2 | 4/2020 | McMillen |
| 2009/0212616 A1 | 8/2009 | McMillen |

(Continued)

FOREIGN PATENT DOCUMENTS

| CN | 102476600 A | * 5/2012 | ............ B60N 2/667 |
| EP | 1827899 A2 | 7/2009 | |

(Continued)

OTHER PUBLICATIONS

Office Action issued by the Chinese Patent Office dated Mar. 29, 2023 concerning the corresponding CN patent application 202110360673.8.

(Continued)

*Primary Examiner* — Timothy J Brindley
(74) *Attorney, Agent, or Firm* — TAROLLI, SUNDHEIM, COVELL & TUMMINO L.L.P.

(57) ABSTRACT

A load support apparatus for a lumbar support assembly is proposed, in which reinforcing ribs are arranged on a lateral surface and a front surface of a concave portion, the load support apparatus maintaining bearing power for supporting an occupant and having a reduced weight. The load support apparatus includes a main support unit including a main plate formed in the shape of a plate, a concave portion formed by one portion of the main plate protruding backward, with a groove being formed in front of the concave portion, and a rib portion formed by protruding from the main plate toward the groove or backward from the main plate.

7 Claims, 5 Drawing Sheets

(51) Int. Cl.
*B60N 2/22* (2006.01)
*B60N 2/68* (2006.01)
(52) U.S. Cl.
CPC ........ *B60N 2/68* (2013.01); *B60N 2002/0236* (2013.01)

(56) References Cited

U.S. PATENT DOCUMENTS

| | | | |
|---|---|---|---|
| 2012/0133183 A1 | 5/2012 | Kim | |
| 2014/0070583 A1* | 3/2014 | McMillen | B60N 2/66 297/284.4 |
| 2014/0125102 A1* | 5/2014 | McMillen | B60N 2/6671 297/284.4 |
| 2015/0203001 A1 | 7/2015 | Akutsu | |
| 2019/0315255 A1* | 10/2019 | Onuma | B60N 2/68 |

FOREIGN PATENT DOCUMENTS

| | | | | |
|---|---|---|---|---|
| JP | 2015-013113 | | 1/2015 | |
| JP | 2016-68895 | A | 5/2016 | |
| JP | 2019-182273 | A | 10/2019 | |
| JP | 2020-196438 | A | 12/2020 | |
| KR | 10-1598960 | B1 | 3/2016 | |
| KR | 10-1664949 | B | 10/2016 | |
| KR | 10-1725413 | B1 | 4/2017 | |
| KR | 101770213 | B1 * | 8/2017 | |
| KR | 10-2020-0024564 | A | 3/2020 | |
| KR | 10-2179955 | B | 11/2020 | |
| KR | 20220144944 | A * | 10/2022 | |
| WO | WO-2013137065 | A1 * | 9/2013 | ........... B60N 2/4228 |
| WO | WO-2016052581 | A1 * | 4/2016 | ............... A47C 7/40 |
| WO | WO-2019042588 | A1 * | 3/2019 | |

OTHER PUBLICATIONS

European search report issued by the European Patent Office dated May 27, 2022 concerning the corresponding EP patent application 21217697.8.

First Examination Report issued by the Indian Patent Office dated Aug. 19, 2022 concerning the corresponding IN patent application 202114061330.

Office Action issued by the Japanese Patent Office dated Jan. 30, 2023 concerning the corresponding JP patent application 2021-207329.

Office Action issued by the Korean Intellectual Property Office dated Nov. 11, 2022 concerning the corresponding KR patent application 10-2021-0018844.

Decision to Grant a Patent issued by the Korean Intellectual Property Office dated Mar. 30, 2023 concerning the corresponding KR patent application 10-2021-0018844.

* cited by examiner

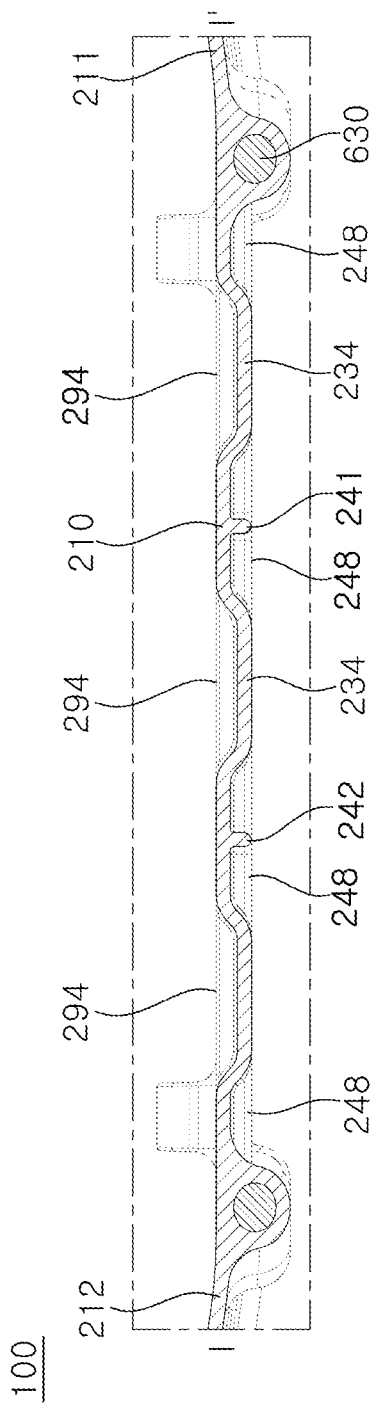
[Fig. 5]

LOAD SUPPORT APPARATUS FOR LUMBAR SUPPORT ASSEMBLY

CROSS REFERENCE TO RELATED APPLICATION

The present application claims priority to Korean Patent Application No. 10-2021-0018844, filed Feb. 10, 2021, the entire contents of which is incorporated herein for all purposes by this reference.

BACKGROUND OF THE INVENTION

Field of the Invention

The present disclosure relates to a load support apparatus and, more specifically, to a load support apparatus combined with a seat frame of a vehicle and configured to support an occupant.

Description of the Related Art

Unless otherwise stated in the present specification, the matters described under this section should not be used as prior art against the claimed invention, and the description under this section is not an admission of prior art.

A seat cushion supporting an occupant's upper body, a seat back supporting an occupant's back, an armrest supporting an occupant's arm, and a headrest supporting an occupant's head may be mounted on a seat. A shape of the seat may be adjusted suitably for an occupant under the control of the occupant.

Lumbar support apparatuses with various structures that support the opposite sides of the upper body of the occupant have been manufactured and developed. However, there is a need to manufacture the lumbar support apparatuses using as small a number of components as possible to increase the performance and the fuel efficiency of a vehicle.

To this end, Korean Patent Nos. 10-1725413 (Patent Document 1) and 10-1598960 (Patent Document 2) disclose a vehicle seat side bolster apparatus and a vehicle lumbar support, respectively.

However, in Patent Documents 1 and 2, the number of components constituting the lumbar support apparatus is not decreased and the volume thereof is not minimized for a decrease in weight and for an improvement in performance while maintaining the durability and the bearing power of the lumbar support apparatus.

The foregoing is intended merely to aid in the understanding of the background of the present disclosure, and is not intended to mean that the present disclosure falls within the purview of the related art that is already known to those skilled in the art.

DOCUMENT OF RELATED ART (Patent Document 1) Korean Patent No. 10-1725413
(Patent Document 2) Korean Patent No. 10-1598960

SUMMARY OF THE INVENTION

An objective of the present disclosure is to provide a load support apparatus in which reinforcing ribs are arranged on a lateral surface and a front surface of a concave portion, the load support apparatus maintaining bearing power for supporting an occupant and having a reduced weight.

In addition, the present disclosure is not limited to the above-described objective, and it would be apparent that another objective may be derived from the following description.

According to an aspect of the present disclosure, there is provided a load support apparatus for a lumbar support assembly, the apparatus including: a main support unit including a main plate famed in the shape of a plate, a concave portion formed by one portion of the main plate protruding backward, with a groove being foiled in front of the concave portion, and a rib portion formed by protruding from the main plate toward the groove or backward from the main plate.

The load support apparatus may further include an assembly wire unit including a wire connected to the main plate in a state where opposite end portions of the wire are spaced apart in opposite directions, extend downward, and are arranged on opposite sides of the rib portion.

In the load support apparatus, the wire may be inserted into the main plate and may surround the rib portion in a state where the opposite end portions of the wire pass through the main plate for extension, extend at a predetermined angle toward each other, and are connected to each other in the shape of a channel.

The load support apparatus may further include a seat back combination unit protruding backward in the shape of a hook from a lower surface of the main plate and combined with a seat back frame.

The load support apparatus may further include an auxiliary support unit in the shape of a plate formed on top of the main support unit.

In the load support apparatus, the main support unit may include a front-side assembling hook formed by one portion of the main plate protruding forward in the shape of a hook.

The load support apparatus may further include a fastening and joining portion formed by one portion of the main support unit protruding backward, with an assembly hole being formed in the fastening and joining portion in a manner that passes through a center portion thereof.

In the load support apparatus, the main support unit may include a traverse or longitudinal tube joining hook formed by adjacent portions of the main support unit protruding backward and extending at a predetermined angle toward each other.

In the load support apparatus according to an embodiment of the present disclosure, the stiffness-enhancing ribs in the shape of a stick in a straight line for reinforcement intersect each other and are connected to each other in front of and behind the main plate. Thus, the advantage of maintaining the bearing power and having a reduced weight can be achieved.

In addition, with wings arranged on the opposite sides, respectively, of the load support apparatus, the advantage of comfortably supporting the opposite side of the back of an occupant can be achieved. The wings on the opposite sides can be manufactured in such a manner that holes formed therein have the same area. Thus, the advantage of maintaining a balance between opposite-side weights of the load support apparatus can be achieved.

The above-described advantages of the present disclosure are exemplary and do not include all advantages inherent in the following description.

In addition, an additional advantage of the present disclosure would be derived from the following description in the present specification. Therefore, such an advantage, if apparent to a person of ordinary skill in the art to which the present disclosure pertains, should be construed as being described in the present specification.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 5 is a cross-sectional view taken along line I-I' on the load support apparatus in FIG. 1.

DETAILED DESCRIPTION OF THE INVENTION

Figure 1:
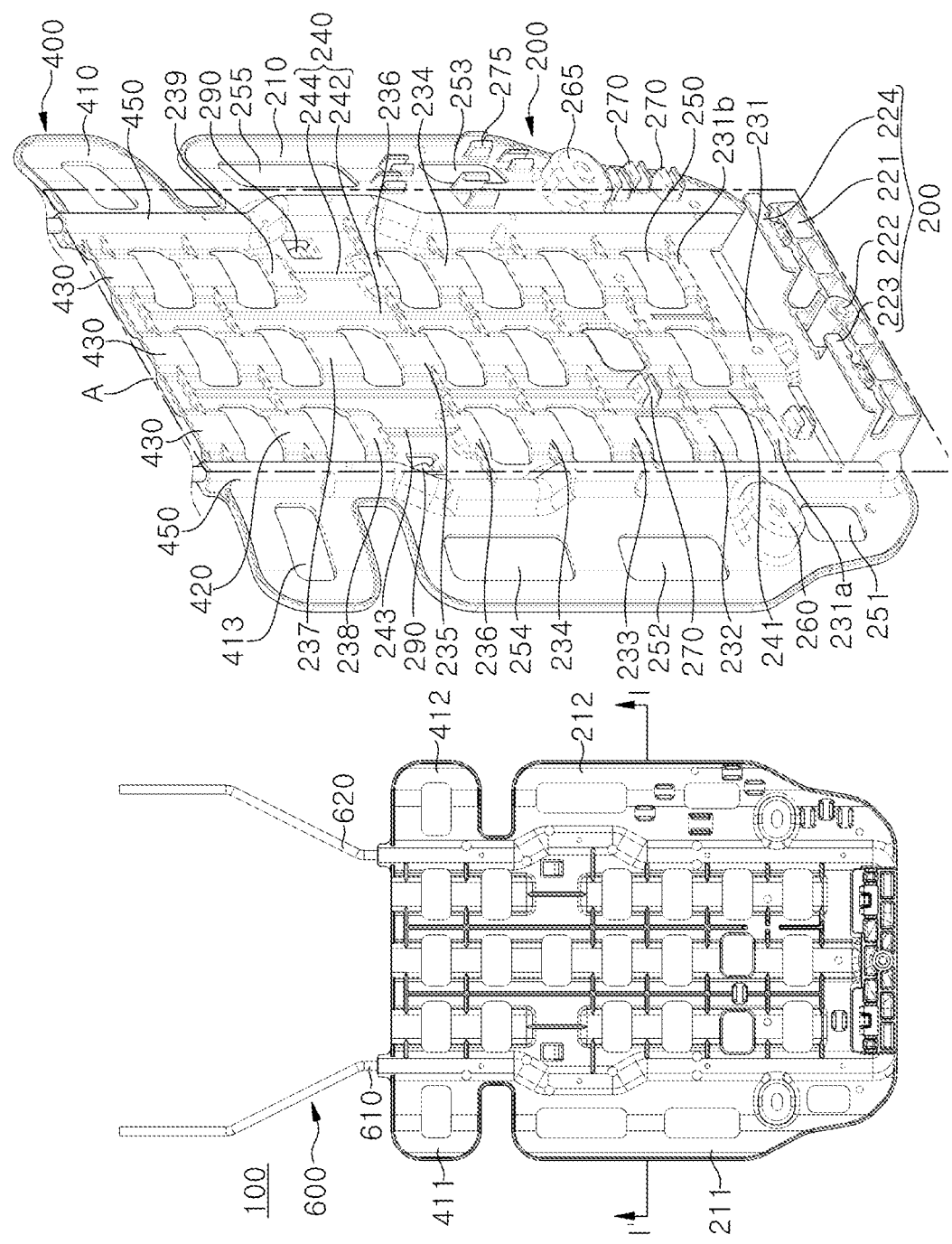
FIG. 1 is a perspective view illustrating a load support apparatus according to an embodiment of the present disclosure.
Figure 2:
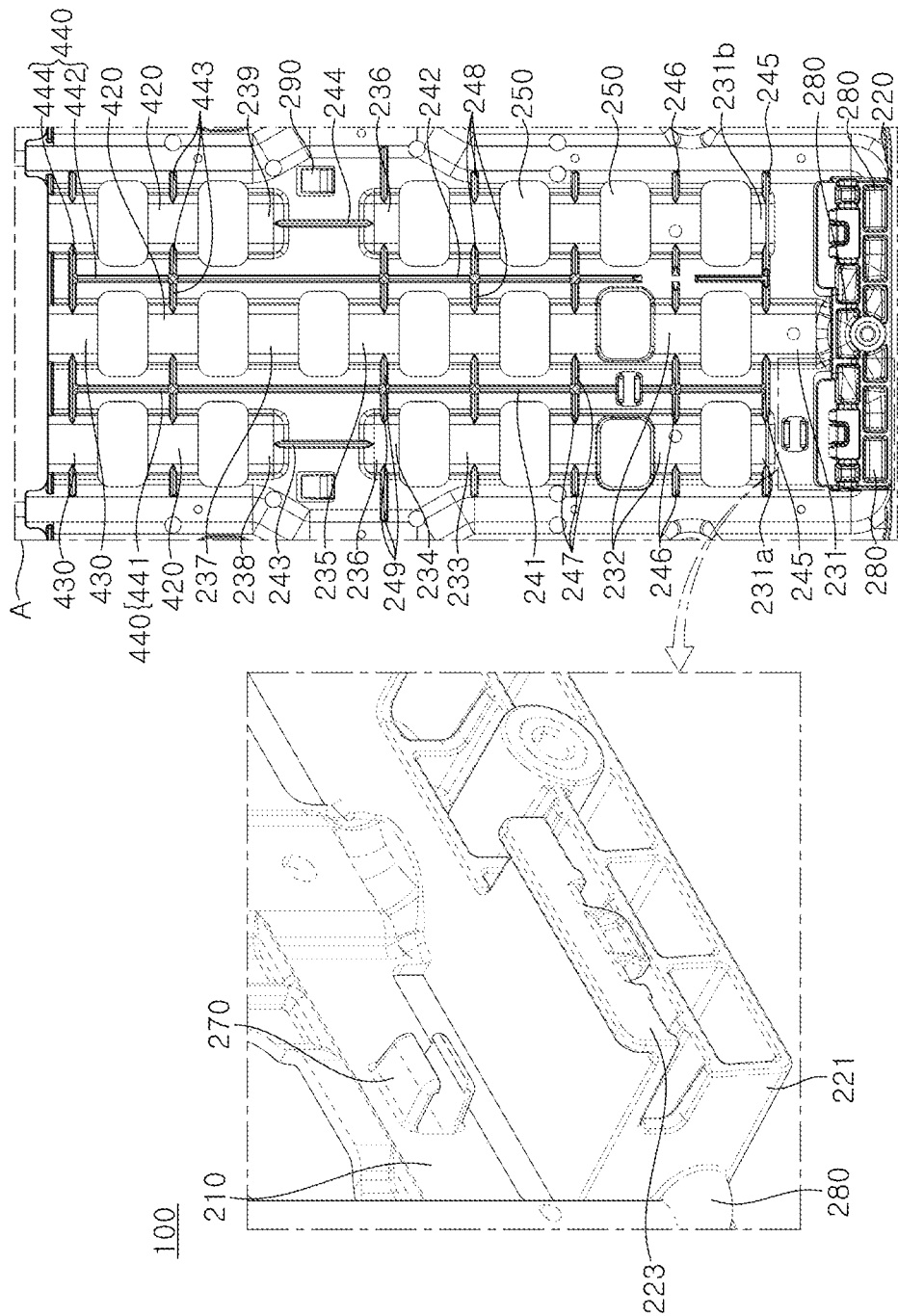
FIG. 2 is an enlarged view illustrating a portion "A" of the load support apparatus in FIG. 1.

A configuration, operation, and an advantageous effect of a lumbar support assembly according to a desired embodiment of the present disclosure will be described below with reference to the accompanying drawings. For purposes of convenience and clarity, a constituent element may be omitted from the drawings or is schematically illustrated in the drawings. A constituent element is not illustrated at actual size. The same constituent element is designated by the same reference character throughout the specification. Reference characters that depict the same constituent element are not repeated in the drawing.

As illustrated in FIGS. 1 to 5, a load support apparatus 100 includes a main support unit 200, an auxiliary support unit 400, and an assembly wire unit 600.

The load support apparatus 100 is manufactured in such a manner as to support the upper body of an occupant sitting on a seat for a lumbar support assembly. A lower portion of the load support apparatus 100 is rotated by a drive device mounted and thus, at various positions of the load support apparatus 100, stably supports the upper body of the occupant.

The main support unit 200 includes a main plate 210, a seat back combination unit 220, concave portions 231, 231a, 231b, 232, 233, 234, 235, 236, 237, 238, and 239), a rib portion 240, central holes 250, a lower hole 251, lateral holes 252, 253, 254, and 255, a first fastening and joining portion 260, a second fastening and joining portion 265, transverse tube joining hooks 270, longitudinal tube joining hooks 275, insertion portions 280, and a front-side assembling hook 290.

The main support unit 200 is formed in the shape of a plate in such a manner that a plurality of holes and a plurality of concave portions are formed alternately in the direction from upward to downward. A first side and a second side of the main support unit 200 extend in the shape of wings at a predetermined angle forward from the main body thereof and support opposite sides, respectively, of the back of the occupant.

The main plate 210 includes a first-side wing portion 211 and a second-side wing portion 212.

Respective portions on a first side and a second side of the main plate 210 are famed in the shape of wings. The central holes 250, the lower hole 251, and the lateral holes 252, 253, 254, and 255 are formed in a rectangular shape inside the main plate 210 in a manner that passes therethrough from top to bottom.

The first-side wing portion 211 formed in the shape of a plate in such a manner as to extend upward or downward from the first side of the main plate 210. The first-side wing portion 211 is formed in such a manner as to extend at a predetermined angle forward from the center of a front surface of the main plate 210.

The second-side wing portion 212 is formed in the shape of a plate in such a manner as to extend upward or downward from the second side of the main plate 210. The first-side wing portion 211 is formed in such a manner as to extend at a predetermined angle forward from the center of the front surface of the main plate 210.

The first-side wing portion 211 and the second-side wing portion 212 are manufactured in such a manner as to be flexibly transformed forward or backward. Thus, the advantage of comfortably supporting the opposite sides of the back of the occupant sitting on the seat can be achieved.

The seat back combination unit 220 includes a combination frame 221, a nut 222, a first hook 223, and a second hook 224.

The seat back combination unit 220 is combined with a rear surface of an end portion of the main plate 210, and seated on a seat back lower-portion frame through a plurality of hooks. Then, the seat back combination unit 220 is combined with the seat back lower-portion frame through a bolt.

The combination frame 221 has a hexahedral shape and is formed in such a manner as to have an internal space inside and to be open at the rear end. The nut 222 is combined with the center of the rear surface of the end portion of the main plate 210. For combination, the nut 222 is rotated around the bolt passing through the seat back lower-portion frame.

One first-side upper end portion of the combination frame 221 extends a predetermined distance backward in the shape of a horizontally flat plate and then further extends vertically upward. This extending forms the first hook 223. The first hook 223 is nested on the seat back lower-portion frame. One portion of a pneumatic lumbar apparatus is mounted on top of the first hook 223.

One second-side upper end portion of the combination frame 221 extends backward in the shape of a horizontally flat plate and then further vertically upward. This extending forms the second hook 224. The second hook 224 is nested on the seat back lower-portion frame. One portion of a pneumatic lumbar apparatus is mounted on top of the first hook 224.

Portions in a rectangular shape of the main plate 210 protrudes backward. This protruding forms the concave portions 231, 231a, 231b, 232, 233, 234, 235, 236, 237, 238, and 239 are formed. Grooves are famed in front of the concave portions 231, 231a, 231b, 232, 233, 234, 235, 236, 237, 238, and 239, respectively.

One portion of the main plate 210 that corresponds to a position over the combination frame 221 protrudes a predetermined distance backyard. This protruding forms the concave portion 231. The concave portion 231 is connected to an upper surface of the combination frame 221.

One portion of the main plate 210 that corresponds to a position over the first hook 223 protrudes a predetermined distance backward. This protruding forms the concave portion 231a. The concave portion 231a has a smaller height than the concave portion 231 and is arranged in such a manner as to be spaced away from the upper surface of the combination frame 221.

One portion of the main plate 210 that corresponds to a position over the second hook 224 protrudes a predetermined distance backward. This protruding forms the concave portion 231b. The concave portion 231b has a smaller height than the concave portion 231 and is arranged in such a manner as to be spaced away from the upper surface of the combination frame 221.

The concave portions 232 are formed over the central holes 250, respectively, that pass through the main plate 210 in the same horizontal lines which correspond to positions over the concave portions 231. The rib portion 240 that protrudes backward in the shape of a stick is formed between each of the concave portions 232.

That is, the concave portions 232 are formed, in the vertical line with respect to the concave portions 231, 231a, and 231b, over the concave portions 231, 231a, and 231b, respectively, with the central hole 250 in between.

The concave portions 233 are formed over the concave portions 232, respectively, with each of the central hole 250 present between the concave portion 233 and the concave portion 232. The central holes 250 here pass through the main plate 210 in the same horizontal lines which correspond to positions over the concave portions 232, respectively. The rib portion 240 that protrudes backward in the shape of a stick is formed between each of the concave portions 233.

The concave portions 234 are formed over the concave portions 233, respectively, with each of the central hole 250 present between the concave portion 234 and the concave portion 233. The central holes 250 here pass through the main plate 210 in the same horizontal lines which correspond to positions over the concave portions 233, respectively. The rib portion 240 that protrudes backward in the shape of a stick is formed between each of the concave portions 234.

The concave portion 235 is formed immediately over the central hole 250 that passes through the main plate 210 at a position that corresponds to a position over the concave portion 234 that is positioned in the middle one of the concave portions 234.

The concave portions 236 are formed over the concave portions 234, respectively, with each of the central holes 250 present between the concave portion 236 and the concave portion 234. The central holes 250 here pass through the main plate 210 at positions, respectively, that correspond to positions immediately over the concave portions 234 which are positioned on the first side and the second side of the main plate 210, among the concave portions 234.

One portion in the shape of a rectangle of the main plate 210 that has a smaller height than the concave portion 235 protrudes backward. This protruding forms each of the concave portions 236. The rib portion 240 that protrudes backward in the shape of a stick is formed between each of the concave portions 236 and each of the concave portions 235.

One portion of the main plate 210 that corresponds to a lower portion of the first-side wing portion 211 is recessed forward in such a manner as to connect spaces in front of and behind the first-side wing portion 211 to each other. This recessing forms the lower hole 251.

The lower hole 251 may be formed in the same horizontal line as the plurality of transverse tube joining hook 270 formed on a lower portion of the second-side wing portion 212. The lower hole 251 may be formed in such a manner that an area thereof is the same as the sum of areas of holes that are positioned between the transverse tube joining hook 270 and pass through the second-side wing portion 212.

In a case where the area of the lower hole 251 is the same as the sum of areas of holes that are positioned between the transverse tube joining hook 270 and pass through the second-side wing portion 212, the first-side wing portion 211 and the second-side wing portion 212 may be manufactured in such a manner as to have the same weight. Thus, the advantage of maintaining a balance between opposite-side weights of the load support apparatus 100 can be achieved.

One portion of the first-side wing portion 211 that corresponds to a position over the lower hole 251 and a position adjacent to the outermost concave portion 233 to the first side is recessed forward in such a manner as to connect the spaces in front of and behind the first-side wing portion 211 to each other. This recessing forms the lateral hole 252.

One portion in the shape of a rectangle of the second-side wing portion 212 that corresponds to a position adjacent to the outermost concave portion 233 to the second side is recessed forward in such a manner as to connect spaces in front of and behind the second-side wing portion 212 to each other. This recessing forms the lateral hole 253.

One portion of the first-side wing portion 211 that is positioned at a position over the lateral hole 252 is recessed forward in such a manner as to connect the spaces in front of and behind the first-side wing portion 211 to each other. This recessing forms the lateral hole 254.

One portion of the second-side wing portion 212 that is positioned at a position over the lateral hole 253 is recessed forward in such a manner as to connect the spaces in front of and behind the second-side wing portion 212 to each other. This recessing forms the lateral hole 255.

The rib portion 240 includes longitudinal stiffness-enhancing ribs 241, 242, 243, and 244, traverse stiffness-enhancing ribs 245, 246, 247, 248, and 249, front traverse stiffness-enhancing ribs 291, 292, 293, 294, and 295, and front longitudinal stiffness-enhancing ribs 256.

One portion of the main plate 210 that corresponds to a portion other than the concave portions 231, 231a, 231b, 232, 233, 234, 235, 236, 237, 238, and 239 protrudes backward in the shape of a stick between the first-side wing portion 211 and the second-side wing portion 212. This protruding forms the rib portion 240.

A first end portion of the longitudinal stiffness-enhancing rib 241 is formed in the shape of a stick in such a manner as to extend upward from a position adjacent to the first side of the concave portion 231 along a rear surface of the main plate 210 that corresponds to a portion between the central holes 250 to the first side, a portion between the concave portions 232 to the first side, and a portion between the concave portions 233 to the first side.

A second end portion of the longitudinal stiffness-enhancing rib 241 extends from the first end portion thereof along a rear surface of the main plate 210 that corresponds to a portion between the central holes 250 to the first side, a portion between the concave portions 234 to the first side, and a portion between the concave portion 235 and the concave portion 236 to the first side, up to a position that corresponds to a position between the concave portion 237 and the concave portion 238.

A first end portion of the longitudinal stiffness-enhancing rib 242 is formed in the shape of a stick in such a manner as to extend upward from a position to the second side of the concave portion 231 along a rear surface of the main plate 210 that correspond to a portion between the central holes 250 to the second side, a portion between the concave portions 232 to the second side, and a portion between the concave portions 233 to the second side.

A second end portion of the longitudinal stiffness-enhancing rib 242 extends from the first end portion thereof along a rear surface of the main plate 210 that corresponds to a portion between the central holes 250 to the second side, a portion between the concave portions 234 to the second side, and a portion between the concave portion 235 and the concave portion 236 to the second side, up to a position that corresponds to a position between the concave portion 237 and the concave portion 239.

The longitudinal stiffness-enhancing rib 243 is formed in the shape of a stick in such a manner as to extend upward from the center portion of an upper surface of the concave portion 236 to the first side along a rear surface of the main plate 210 up to the center portion of a lower surface of the concave portion 238.

The longitudinal stiffness-enhancing rib 244 is formed in the shape of a stick in such a manner as to extend upward from the center portion of an upper surface of the concave portion 236 to the second side along a rear surface of the main plate 210 up to the center portion of a lower surface of the concave portion 239.

The traverse stiffness-enhancing ribs 245, 246, 247, 248, and 249 are formed on portions other than the concave portions 231, 231a, 231b, 232, 233, 234, 235, 236, 237, 238, and 239 of the main plate 210 in a manner that protrudes backward from the rear surface of the main plate 210 and improves the bearing power and the durability of the main plate 210.

The traverse stiffness-enhancing ribs 245 are formed in the shape of a stick in such a manner as to extend from a position adjacent to the first side or second side of the concave portion 231 to a position to the second side or first side of the concave portion 231 along a rear surface of the main plate 210. The traverse stiffness-enhancing ribs 245 are arranged blow the concave portions 231a and 231b, respectively.

The traverse stiffness-enhancing ribs 246 are formed in the shape of a stick in such a manner as to connect the concave portions 232 to each other in the same horizontal line as the concave portions 232 are positioned and to intersect the longitudinal stiffness-enhancing ribs 241 and 242. The traverse stiffness-enhancing ribs 246 are arranged between the first-side wing portion 211 and the second-side wing portion 212.

The traverse stiffness-enhancing ribs 247 are formed in the shape of a stick in such a manner as to connect the concave portions 233 to each other in the same horizontal line as the concave portions 233 are positioned and to intersect the longitudinal stiffness-enhancing ribs 241 and 242. The traverse stiffness-enhancing ribs 247 are arranged between the first-side wing portion 211 and the second-side wing portion 212.

The traverse stiffness-enhancing ribs 248 are formed in the shape of a stick in such a manner as to connect the concave portions 234 to each other in the same horizontal line as the concave portions 234 are positioned and to intersect the longitudinal stiffness-enhancing ribs 241 and 242. The traverse stiffness-enhancing ribs 248 are arranged between the first-side wing portion 211 and the second-side wing portion 212.

The traverse stiffness-enhancing ribs 249 are formed in the shape of a stick in such a manner as to connect the concave portion 235 and the concave portion 236 to each other in the same horizontal line as the concave portion 235 and the concave portion 236 are positioned and to intersect the longitudinal stiffness-enhancing ribs 241 and 242. The traverse stiffness-enhancing ribs 249 are arranged between the first-side wing portion 211 and the second-side wing portion 212.

Therefore, the rib portion 240 is formed in the shape of a stick in such a manner as to protrude backward from the rear surface of the main plate 210 between each of the concave portions 231, 231a, 231b 232, 233, 234, 235, 236, 237, 238, and 239 formed to improve the flexibility of the main plate 210 and improves the strength and the bearing power of the main plate 210.

In addition, the rib portion 240 protrudes from rear surfaces of portions other than the concave portions 231, 231a, 231b, 232, 233, 234, 235, 236, 237, 238, and 239 of the main plate 210. Thus, the advantage of improving the quality of the injection molding of the main support unit 200 can be achieved.

One portion of the main plate 210 that corresponds to each of a position adjacent to the first side of the longitudinal stiffness-enhancing rib 243 and a position adjacent to the second side of the longitudinal stiffness-enhancing rib 244 protrudes forward in the shape of a hook. This protruding forms the front-side assembling hooks 290.

Through the front-side assembling hooks 290, a cushion or components of the pneumatic lumbar apparatus may be removably combined with the front surface of the main plate 210.

Figure 3:
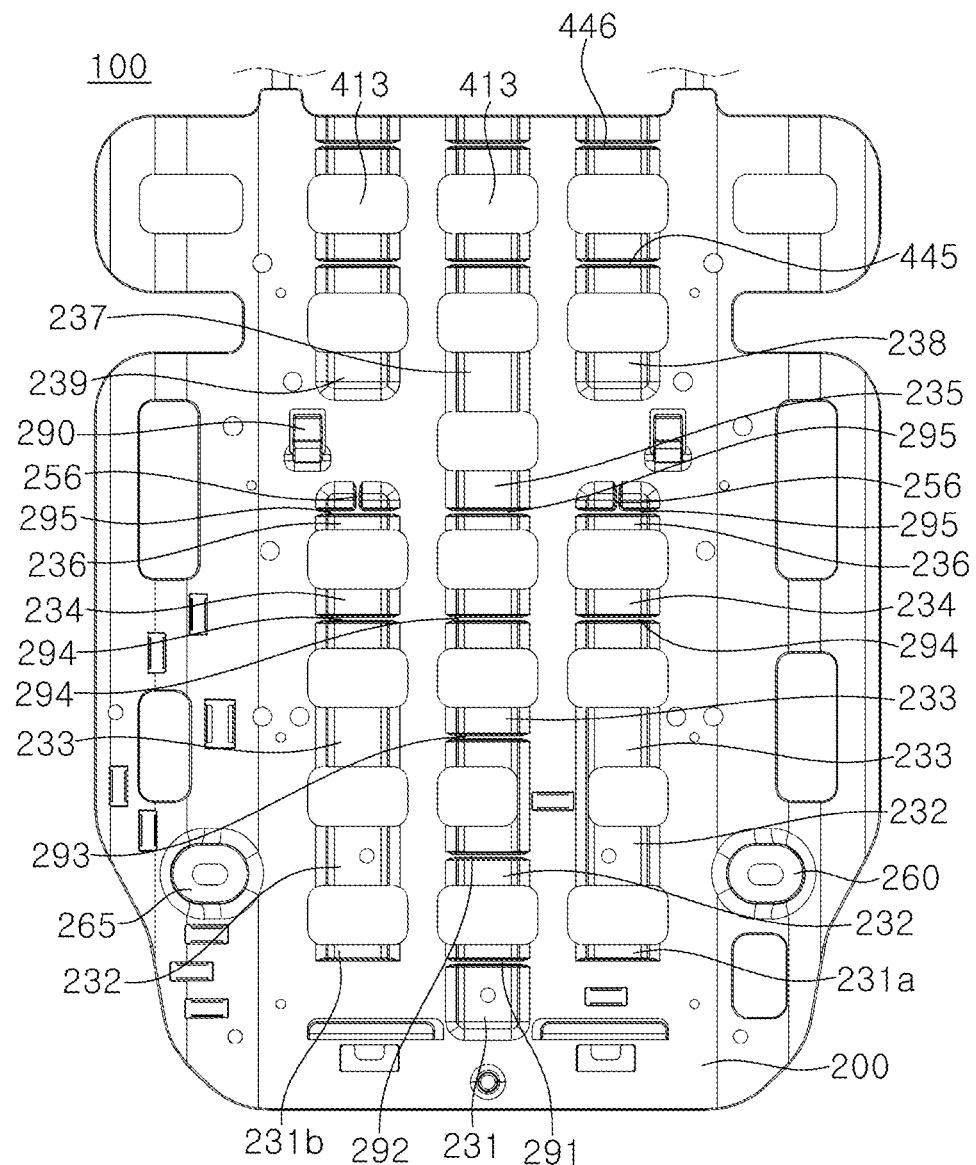
FIG. 3 is a front view illustrating the load support apparatus in FIG. 1.
Figure 4:
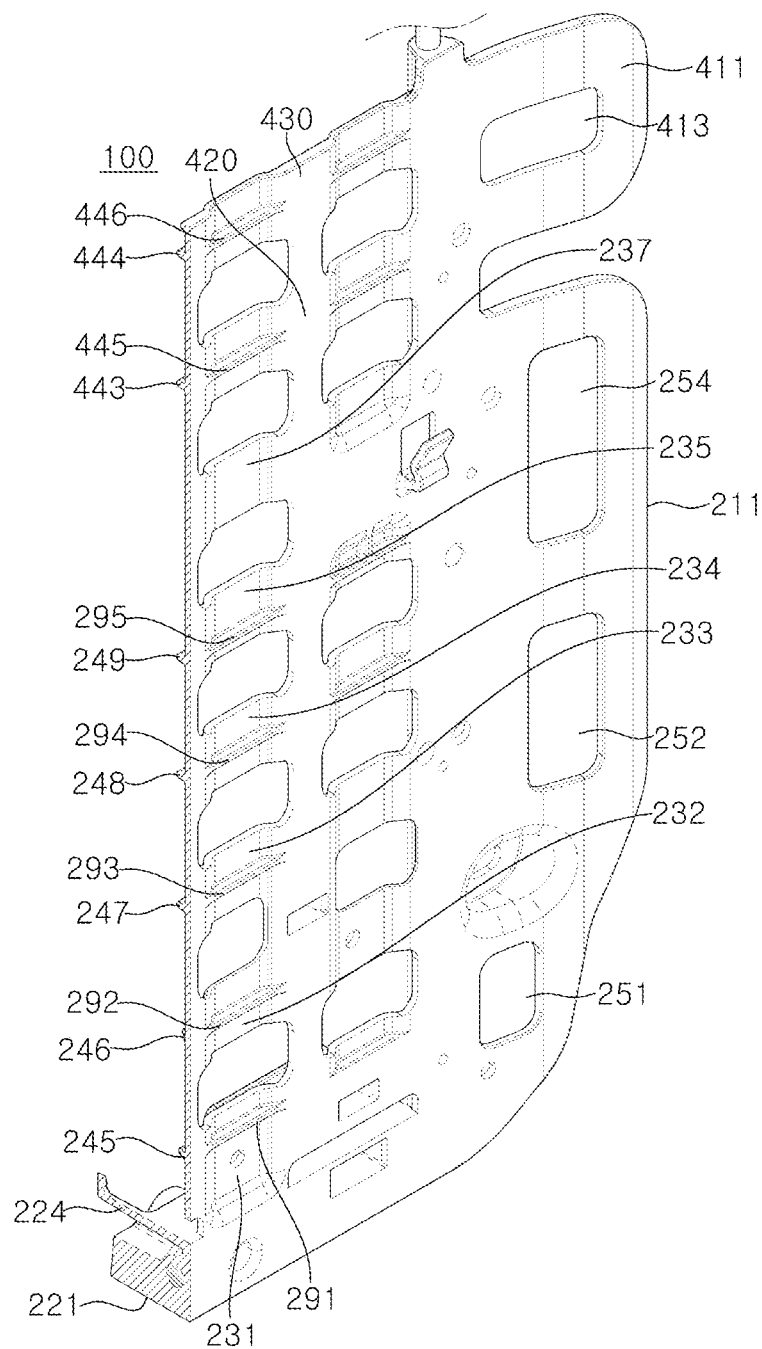
FIG. 4 is a perspective cross-sectional view illustrating the load support apparatus in FIG. 1, when viewed from a second-side direction.

As illustrated in FIGS. 3 and 4, the front traverse stiffness-enhancing rib 291 is formed in the shape of a stick in such a manner as to connect center portions of opposite-side inner lateral surfaces of a groove formed in the front surface of the main plate 210 by the concave portion 231.

The front traverse stiffness-enhancing rib 292 is formed in the shape of a stick in such a manner as to connect center portions of opposite-side inner lateral surfaces of a groove formed in the front surface of the main plate 210 by the concave portion 232 that is positioned in the middle one of the concave portions 232.

The front traverse stiffness-enhancing rib 292 is formed in the same horizontal line as the traverse stiffness-enhancing ribs 246 and is connected to the traverse stiffness-enhancing ribs 246 through the main plate 210. Thus, the front traverse stiffness-enhancing rib 292 is formed in the shape of a stick in a straight line in such a manner as to extend toward the first side or the second side.

The front traverse stiffness-enhancing rib 293 is formed in the shape of a stick in such a manner as to connect center portions of opposite-side inner lateral surfaces of a groove formed in the front surface of the main plate 210 by the concave portion 233 that is positioned in the middle one of the concave portions 233.

The front traverse stiffness-enhancing rib 293 is formed in the same horizontal line as the traverse stiffness-enhancing ribs 247 and is connected to the traverse stiffness-enhancing ribs 247 through the main plate 210. Thus, the front traverse stiffness-enhancing rib 293 is formed in the shape of a stick in a straight line in such a manner as to extend toward the first side or the second side.

The front traverse stiffness-enhancing ribs 294 are formed in the shape of a stick in such a manner as to connect center portions of opposite-side inner lateral surfaces of grooves formed in the front surface of the main plate 210 by the concave portions 234.

The front traverse stiffness-enhancing rib 294 is formed in the same horizontal line as the traverse stiffness-enhancing ribs 248 and is connected to the traverse stiffness-enhancing ribs 248 through the main plate 210. Thus, the front traverse stiffness-enhancing rib 294 is formed in the shape of a stick in a straight line in such a manner as to extend toward the first side or the second side.

The front traverse stiffness-enhancing ribs 295 are formed in the shape of a stick in such a manner as to connect center portions of opposite-side inner lateral surfaces of grooves formed in the front surface of the main plate 210 by the concave portions 235 and 236.

The front traverse stiffness-enhancing rib 295 is formed in the same horizontal line as the traverse stiffness-enhancing ribs 249 and is connected to the traverse stiffness-enhancing ribs 249 through the main plate 210. Thus, the front traverse stiffness-enhancing rib 295 is formed in the shape of a stick in a straight line in such a manner as to extend toward the first side or the second side.

Each of the front longitudinal stiffness-enhancing rib 256 extends vertically upward from each of the center portions of the front traverse stiffness-enhancing ribs 295 inside grooves formed in the front surface of the main plate 210 by the concave portions 236, and is connected to an inner lateral surface of the main plate 210.

Therefore, the advantage of improving the durability of each of the concave portions 231, 232, 233, 234, 235, and 236 through the front traverse stiffness-enhancing ribs 291, 292, 293, 294, and 295 and the front longitudinal stiffness-enhancing ribs 256 can be achieved.

In addition, the longitudinal stiffness-enhancing ribs 243 and 244 and the front longitudinal stiffness-enhancing ribs 256 are connected to each other in the same vertical line with each of the concave portions 236 in between. Thus, the advantage of improving the durability of the concave portions 236 can be achieved.

In addition, each of the front traverse stiffness-enhancing ribs 291, 292, 293, 294, and 295 is connected to each of the traverse stiffness-enhancing ribs 245, 246, 247, 248, and 249 with the main plate 210 in between, and is formed in the shape of a stick in a straight line. Accordingly, a thickness in the forward-backward direction of the load support apparatus 100 itself is decreased. Thus, the advantage of reducing the volume and continuously maintaining the bearing power can be achieved.

One portion of the first-side wing portion 211 that corresponds to a position below the lateral hole 252 protrudes backward. This protruding forms the first fastening and joining portion 260 in the shape of a cylinder that has an internal space and is open at the front. A through-hole is formed in a rear surface of the first fastening and joining portion 260 in a manner that passes through a center portion thereof.

One portion of the second-side wing portion 212 protrudes backward in the same horizontal line as the first fastening and joining portion 260 is positioned. This protruding forms the second fastening and joining portion 265 in the shape of a cylinder that has an internal space and is open at the front. A through-hole is formed in a rear surface of the second fastening and joining portion 265 in a manner that passes through a center portion thereof.

The first and second fastening and joining portions 260 and 265 are combined with fastening clips, respectively, through the through-holes formed in the rear surfaces thereof, and thus a wire or tube of the pneumatic lumbar apparatus combined with the rear surface of the main plate 210 is fixed to the main plate 210.

The transverse tube joining hooks 270 are arranged to be spaced apart a predetermined distance in the upward-downward direction under the second fastening and joining portion 265 in the second-side wing portion 212 and are combined with the tube connected to the pneumatic lumbar apparatus.

One upper portion and one lower portion of a hole in the shape of a rectangle passing through the second-side wing portion 212 extend a predetermined distance backward and then extend vertically toward each other in the shape of a hook. This extending forms the transverse tube joining hooks 270 that are removably combined with the tube.

The longitudinal tube joining hooks 275 are formed in the vicinity of the lateral hole 253 on a rear surface of the second-side wing portion 212 and are removably combined with the tubes connected to the pneumatic lumbar apparatus.

One first-side portion and one second-side portion of the hole in the shape of a rectangle passing through the second-side wing portion 212 extend a predetermined distance backward and then extend vertically toward each other in the shape of a hook. This extending forms the longitudinal tube joining hooks 275 that are removably combined with the tube.

The assembly wire unit 600 includes a first wire 610, a second wire 620, and a connection wire 630.

The insertion portion 280 has the shape of a channel and is open at the top. The insertion portion 280 is formed in the shape of "U" surrounding a space between the first-side wing portion 211 and the second-side wing portion 212. The connection wire 630 is inserted into the insertion portion 280 connecting the first and second wires 610 and 620.

A lower end portion of the insertion portion 280 passes through the combination frame 221 from the first side of the combination frame 221 to the second side thereof for extension, and is firmly combined with the seat back combination unit 220. The bearing power of each of the first wire and the second wire 610 and 620 is improved with the combination of a seat back frame and the seat back combination unit 220.

The rib portion 240 is formed inside the insertion portion 280 and thus improves the durability and the bearing power of a portion of the main plate 210 that corresponds to the space between the first-side wing portion 211 and the second-side wing portion 212. The first-side wing portion 211 and the second-side wing portion 212 can be relatively flexibly manufactured and comfortably supports the opposite sided of the back of the occupant or the like.

The auxiliary support unit 400 includes an auxiliary plate 410, concave portions 420 and 430, a rib portion 440, and an insertion portion 450.

The auxiliary support unit 400 is formed in the shape of a rectangular plate and is connected on top of the main support unit 200. The auxiliary support unit 400 supports the upper body or shoulder of the occupant or the like sitting on the seat. Thus, the advantage of comfortably supporting the opposite sides of the back or the shoulder using the opposite-side wings can be achieved.

The auxiliary plate 410 is formed in the shape of a rectangular plate in such a manner as to extend a long distance toward the first side or the second side. A first-side upper wing portion 411 and a second-side upper wing portion 412 that have a rectangular shape are formed on the first side thereof and the second side, respectively.

A plurality of upper holes 413 is formed in a rectangular shape in the auxiliary plate 410 in a manner that passes through the auxiliary plate 410 so that, from the first-side end of the auxiliary plate 410 to the second-side end, they are spaced apart a predetermined distance.

The first-side upper wing portion 411 is separated from a center portion of the auxiliary plate 410 with the insertion portion 450 in between. The insertion portion 450 here is connected to a first-side upper portion of the insertion portion 280. The first-side upper wing portion 411 is formed in such a manner as to rotate forward at a predetermined angle about the insertion portion 450.

The second-side upper wing portion 412 is separated from the center portion of the auxiliary plate 410 with the insertion portion 450 in between. The insertion portion 450 here is connected to a second-side upper portion of the insertion portion 280. The second-side upper wing portion 412 is formed in such a manner as to rotate forward at a predetermined angle about the insertion portion 450.

The first-side upper wing portion 411 and the second-side upper wing portion 412 are formed in such a manner as to be spaced away from the first-side wing portion 211 and the second-side wing portion 212, respectively and, when a load is applied, are transformed. Thus, the back or the shoulder of the occupant is comfortably supported.

One portion of the auxiliary plate 410 positioned in the same vertical line as each of the concave portions 232 protrudes backward from each of the upper holes 413 positioned in the center portion of the auxiliary plate 410. This protruding forms each of the concave portions 420.

One portion of the auxiliary plate 410 that corresponds to a position over each of the upper holes 413 positioned in the center portion of the auxiliary plate 410 protrudes a predetermined distance backward. This protruding forms each of the concave portions 430.

The rib portion 440 includes longitudinal stiffness-enhancing ribs 441 and 442, traverse stiffness-enhancing ribs 443 and 444, and front traverse stiffness-enhancing ribs 445 and 446.

One portion of the main plate 210 that corresponds to a position between the concave portions 420 and 430 between the first-side upper wing portion 411 and the second-side upper wing portion 412 protrudes forward or backward in the shape of a stick. This protruding forms the rib portion 440.

The longitudinal stiffness-enhancing rib 441 is connected to an upper portion of the longitudinal stiffness-enhancing rib 241 in the same vertical line as the longitudinal stiffness-enhancing rib 241 is positioned, passes through the upper holes 413, and extends upward up to a position that corresponds to a position between the concave portions 430.

The longitudinal stiffness-enhancing rib 442 is connected to an upper portion of the longitudinal stiffness-enhancing rib 242 in the same vertical line as the longitudinal stiffness-enhancing rib 242 is positioned, passes through the upper holes 413, and extends upward up to a position that corresponds to a position between the concave portions 430.

Each of the traverse stiffness-enhancing ribs 443 connects the concave portions 420 to each other at a position that corresponds to a position between the insertion portions 450, and protrudes from a rear surface of the auxiliary plate 410 in the shape of a stick in such a manner as to intersect the longitudinal stiffness-enhancing ribs 441 and 442.

Each of the traverse stiffness-enhancing ribs 444 connects the concave portions 430 to each other at a position that corresponds to a position between the insertion portions 450, and protrudes from the rear surface of the auxiliary plate 410 in the shape of a stick in such a manner as to be connected to upper portions of the longitudinal stiffness-enhancing ribs 441 and 442.

Each of the front traverse stiffness-enhancing ribs 445 is formed in the shape of a stick in such a manner as to connect inner lateral surfaces of the auxiliary plate 410 to each other inside a rectangular groove formed in a front surface of each of the concave portions 420.

Each of the front traverse stiffness-enhancing ribs 446 is formed in the shape of a stick in such a manner as to connect inner lateral surfaces of the auxiliary plate 410 to each other inside a rectangular groove formed in a front surface of each of the concave portions 430.

The desired embodiment of the present disclosure is described above with reference to the accompanying drawings. However, the embodiment described in the present disclosure and the constituent elements illustrated in the drawings are only exemplary. It should be understood that various equivalents and modifications to the embodiment that fall within the scope of the technical idea of the present disclosure would be present at the time of filing the present application. Therefore, it should be understood that the above-described embodiment is illustrative and non-restrictive in all respects. The scope of the present disclosure is defined in the following claims rather than the detailed description provided above. Alterations of, modifications to, and equivalents to the embodiment that are derived from the detailed description and the following claims should be interpreted as being included within the scope of the present disclosure.

DESCRIPTION OF THE REFERENCE NUMERALS IN THE DRAWINGS

100: load support apparatus
200: main support unit
210: main plate
220: seat back combination unit
240: rib portion
250: central holes
260: first fastening and joining portion
265: second fastening and joining portion
270: transverse tube joining hook
275: longitudinal tube joining hooks
280: insertion portion
400: auxiliary support unit
600: assembly wire unit

What is claimed is:
1. A load support apparatus for a lumbar support assembly, the apparatus comprising:
a main support unit including a main plate formed in the shape of a plate respective portions on a first side and a second side of which are formed in the shape of wings as a first-side wing portion and a second-side wing portion, a concave portion formed by one portion of the main plate protruding backward, with a groove being formed in front of the concave portion, and a rib portion formed by protruding from the main plate; and
an assembly wire unit including a wire connected to the main plate in a state where opposite end portions of the wire are spaced apart in opposite directions, and extend downward;
wherein the opposite end portions of the wire spaced apart in opposite directions form boundaries between the first-side wing portion and the second-side wing portion and the remaining part of the main plate;

wherein the rib portion is formed only between the first-side wing portion and the second-side wing portion and only between the opposite end portions of the wire spaced apart in opposite direction; and wherein the rib portion includes traverse stiffness-enhancing ribs which are formed on portions other than the concave portions of the main plate in a manner that protrude backward from the rear surface of the main plate and front traverse stiffness-enhancing ribs which are formed in the shape of a stick in such a manner as to connect center portions of opposite-side inner lateral surfaces of a groove formed in the front surface of the main plate by the concave portion, and the front traverse stiffness-enhancing ribs are formed in the same horizontal line as the traverse stiffness-enhancing ribs and are connected to the traverse stiffness-enhancing ribs through the main plate so that the front traverse stiffness-enhancing ribs and the traverse stiffness-enhancing ribs are formed in the shape of a stick in a straight line in such a manner as to extend toward the first side or the second side.

2. The load support apparatus of claim 1, wherein the wire is inserted into the main plate and surrounds the rib portion in a state where the opposite end portions of the wire pass through the main plate for extension, extend at a predetermined angle toward each other, and are connected to each other in the shape of a channel.

3. The load support apparatus of claim 1, further comprising:
a seat back combination unit protruding backward in the shape of a hook from a lower surface of the main plate to be combined with a seat back frame.

4. The load support apparatus of claim 1, further comprising:
an auxiliary support unit in the shape of a plate formed on top of the main support unit.

5. The load support apparatus of claim 1, wherein the main support unit comprises:
a front-side assembling hook formed by one portion of the main plate protruding forward in the shape of a hook.

6. The load support apparatus of claim 1, further comprising:
a fastening and joining portion formed by one portion of the main support unit protruding backward, with an assembly hole being formed in the fastening and joining portion in a manner that passes through a center portion thereof.

7. The load support apparatus of claim 1, wherein the main support unit comprises:
a traverse or longitudinal tube joining hook formed by adjacent portions of the main support unit protruding backward and extending at a predetermined angle toward each other.

* * * * *